(No Model.)
W. A. GALBRAITH.
CARRIAGE POLE.
No. 422,397. Patented Mar. 4, 1890.
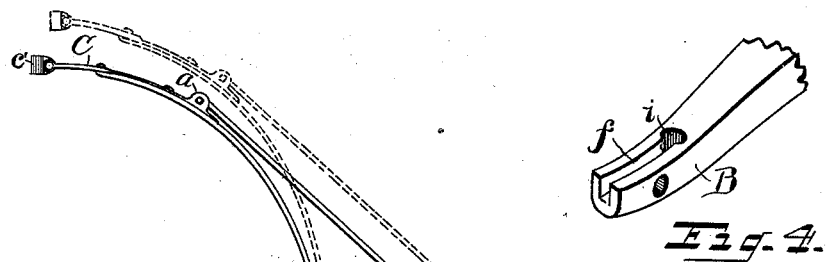
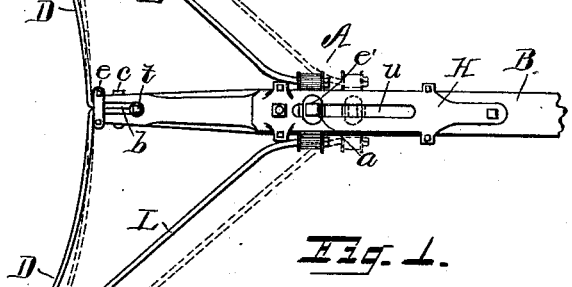
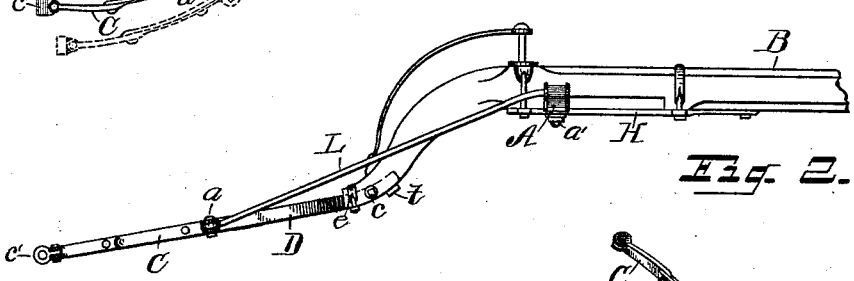
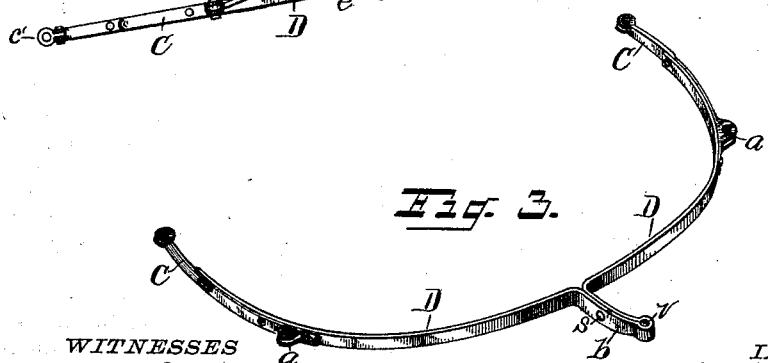
WITNESSES
INVENTOR
W. A. Galbraith
By Ranos B. Wheeler
Attorney.

UNITED STATES PATENT OFFICE.

WILLIAM A. GALBRAITH, OF FLINT, MICHIGAN.

CARRIAGE-POLE.

SPECIFICATION forming part of Letters Patent No. 422,397, dated March 4, 1890.

Application filed November 25, 1889. Serial No. 331,565. (No model.)

*To all whom it may concern:*

Be it known that I, WILLIAM A. GALBRAITH, a citizen of the United States, residing at Flint, in the county of Genesee and State of Michigan, have invented certain new and useful Improvements in Carriage-Poles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in adjustable carriage-poles; and it consists in forming the circle-iron of one continuous piece of spring metal, bent in the form of an arc and doubled at its center upon itself to form a shank for attachment to the rear end of the pole, the brace-rods connecting the circle-iron to a head sliding on a plate secured to the under side of the pole, all of which will be hereinafter more fully set forth, and the essential features of the device pointed out particularly in the claims.

In the accompanying drawings, forming a part of this specification, Figure 1 is a plan view of the under side of a pole embodying my invention. Fig. 2 is a side elevation of same. Fig. 3 is an enlarged detail of the spring circle-iron removed from the pole. Fig. 4 is a view of the rear end of the pole, showing the recess therein that receives the shank of the spring circle-iron.

Referring to the letters of reference in the drawings, B indicates the pole, D the spring-metal circle-iron, and L L the brace-rods. The circle-iron D is formed of one continuous piece of spring metal, which is doubled upon itself at the center, forming the shank $b$, with the eye $v$ in the end thereof, said shank also having the hole $s$ passing transversely therethrough. (See Fig. 3.) The circle-iron D is bent at right angles to the shank $b$ and in the form of an arc, its free ends being provided with the rigid extension-irons C, which are bolted thereto, said extension-irons carrying at their rear ends the pivoted head $c'$, having an eye therein for engagement to the clips on the axle of the vehicle.

The rear end of the pole is provided in its under face with the recess $f$, having the rounded end portion $i$. (See Fig. 4.)

The circle-iron is attached to the rear end of the pole by placing the shank $b$ thereof in the recess $f$ of the pole, the enlarged end of said shank having the eye $v$ fitting into the rounded portion $i$ of the recess $f$, said shank being secured therein by the bolt $t$, passing vertically through the pole and the eye $v$, and the bolt $c$, passing transversely through the pole and the hole $s$ in the shank. The clip $e$, encircling the rear end of the pole, forms a housing and prevents the spring of the circle-iron from splitting the pole and holds the parts in place.

The rear ends of the brace-rods L L are pivotally coupled at $a$ to the extension-irons C C. The forward ends of said rods are attached to a head A, which is adapted to slide between the under side of the pole and the plate H, secured thereto, said head having a screw-threaded stem that passes loosely through the slot $u$ in the plate H, and is adapted to travel therein as the head is adjusted, the stem receiving on its lower end the washer $e'$ and nut $a'$, as shown in Fig 1. By tightening the nut $a'$ the head A is drawn tightly against the upper face of the plate H, securely locking it thereto.

The construction and arrangement of the above-described head A and plate H, however, do not form a part of this application, as they are described and claimed in another application filed herewith, but are shown herein to carry out the operation of the pole.

The adjustment of the pole is accomplished by loosening the nut $a'$, when the head A will be released, allowing the free ends of the circle-iron to be sprung out or in, as desired, the head A sliding on the plate H as the circle-iron is adjusted, which will be readily understood, and is shown by dotted lines in Fig. 1. When the pole has been adjusted, the nut $a'$ is tightened, thus locking the parts in place. Any suitable means may be employed to adjust the head A on the pole.

It will be seen that by means of the rigid extension-irons bolted to the rear ends of the circle-iron and the brace-rods coupled thereto a strong and unyielding brace is formed, extending from the clips on the axle to the sides of the pole, so that when the head A is locked said brace prevents any lateral springing of the pole, as in turning the vehicle by means of the pole.

Having thus fully set forth my invention, what I claim as new, and desire to secure by Letters Patent, is—

1. In combination with the pole having the recess in the rear end thereof, the spring-metal circle-iron having the shank formed integral therewith, and extension-irons mounted on the free ends thereof, the clip encircling the rear end of the pole, and the brace-rods pivotally coupled to the extension-irons at their rear ends and adjustably coupled to the body of the pole at their forward ends, as and for the purposes specified.

2. In combination with the pole recessed at the rear end, the spring-metal circle-bar having the shank $b$ formed integral therewith, and having the eye in the end thereof, said shank filling the recess of the pole, the bolts and clips binding said parts to the pole, the extension-irons mounted on the outer end portions of the circle-bar, and the brace-rods pivotally coupled at $a$ to the extension-irons, the forward ends of said rods coupled to a head mounted on the pole and adapted to travel thereon, and for the purposes specified.

In testimony whereof I affix my signature in presence of two witnesses.

WILLIAM A. GALBRAITH.

Witnesses:
CHARLES LOVEJOY,
JAMES BRYANS.